United States Patent
Radke

(10) Patent No.: US 11,575,658 B2
(45) Date of Patent: Feb. 7, 2023

(54) ENCRYPTION DEVICE, A COMMUNICATION SYSTEM AND METHOD OF EXCHANGING ENCRYPTED DATA IN A COMMUNICATION NETWORK

(71) Applicant: Linxens Holding, Mantes la Jolie (FR)

(72) Inventor: Stephan Radke, Allemagne (DE)

(73) Assignee: LINXENS HOLDING, Mantes la Jolie (FR)

( * ) Notice: Subject to any disclaimer, the term of this patent is extended or adjusted under 35 U.S.C. 154(b) by 239 days.

(21) Appl. No.: 16/973,383

(22) PCT Filed: Jun. 8, 2018

(86) PCT No.: PCT/IB2018/001093
§ 371 (c)(1),
(2) Date: Dec. 8, 2020

(87) PCT Pub. No.: WO2019/234470
PCT Pub. Date: Dec. 12, 2019

(65) Prior Publication Data
US 2021/0194855 A1 Jun. 24, 2021

(51) Int. Cl.
*H04L 9/40* (2022.01)
*H04L 9/08* (2006.01)

(52) U.S. Cl.
CPC ........ *H04L 63/0428* (2013.01); *H04L 9/0825* (2013.01); *H04L 9/0861* (2013.01); *H04L 9/0894* (2013.01)

(58) Field of Classification Search
CPC . H04L 63/0428; H04L 9/0825; H04L 9/0861; H04L 9/0894; H04L 9/0897;
(Continued)

(56) References Cited

U.S. PATENT DOCUMENTS

| 2016/0219024 A1* | 7/2016 | Verzun ..................... H04L 9/34 |
| 2017/0063554 A1 | 3/2017 | An et al. |
| 2018/0091294 A1* | 3/2018 | Iyer ....................... H04L 9/0891 |

FOREIGN PATENT DOCUMENTS

| EP | 3139564 A1 * | 3/2017 | ............... H04K 1/00 |
| WO | 2019/234470 A1 | 12/2019 | |

OTHER PUBLICATIONS

International Search Report for related International Patent Application No. PCT/IB2018/001093, dated Jan. 2, 2019, 4 pages.

(Continued)

*Primary Examiner* — Kristine L Kincaid
*Assistant Examiner* — Lydia L Noel
(74) *Attorney, Agent, or Firm* — Ditthavong, Steiner & Mlotkowski

(57) ABSTRACT

The present disclosure provides in various aspects an encryption device (100), a communication system and a method of exchanging encrypted data in such a network. In accordance with some illustrative embodiments of an aspect, the encryption device (100) comprises a communication interface (110), a variable key generator (120) configured to generate at least two keys, a memory (130) configured to store keys that are either generated by the variable key generator (120) and/or received at the communication interface (110), and an encryption/decryption component (140) configured to successively use keys stored in the memory (130) for encrypting a plaintext received at the communication interface (110) and for decrypting a ciphertext received at the communication interface (110), wherein the communication interface (110) is configured to communicate with an associated separate communication device which is used by a user of the encryption device (100) for communicating in a communication network.

17 Claims, 6 Drawing Sheets

(58) Field of Classification Search
CPC ..... H04L 9/10; H04L 9/12; H04L 9/14; H04L 63/068; H04L 9/06; H04L 63/062
See application file for complete search history.

(56) References Cited

OTHER PUBLICATIONS

Laban et al., "HECTOR: D4.1 Demonstrator Specification", Start date Mar. 1, 2015, End date Feb. 28, 2018, 80 Pages.

* cited by examiner

ENCRYPTION DEVICE, A COMMUNICATION SYSTEM AND METHOD OF EXCHANGING ENCRYPTED DATA IN A COMMUNICATION NETWORK

CROSS-REFERENCE TO RELATED APPLICATIONS

This application claims the benefit of PCT Patent Application No. PCT/IB2018/001093, filed on Jun. 8, 2018, the contents of which are hereby incorporated herein in their entirety by this reference.

BACKGROUND

1. Field of the Invention

The present invention relates to an encryption device, a communication system and a method of exchanging encrypted data in a communication network. In particular, the present invention relates to separate and/or external crypto systems and to a secure communication among communication systems in a communication network.

2. Description of the Related Art

Data security in electronic communications is essential not only for many organizations, particularly in regulated industries, government services and industries in which the electronic communications may contain sensitive proprietary or confidential information, but also in everyday life when, for example, carrying out financial transactions or in E-commerce, such as mobile commerce, electronic fund transfers, supply chain management, internet marketing, online transaction processing, electronic data interchange, inventory management systems, and automated data collection systems. Although an increasing number of platforms for electronic communications provide for protected communication, the content of those communications is not believed being sufficiently secure.

For example, there is a security gap with conventional message encryption because the encryption keys assigned to parties participating in a communication are fixed and do not change during communications. Once the key is broken or cracked, the privacy of written messages is compromised, a situation of which participating parties in effected communications may not be aware of.

Document US 2006/0077034 A1 describes an RFID system which employs asymmetric encryption of encryption keys that are stored on a separate element of an RFID infrastructure. The keys are only retrievable in encrypted form after an authentication to retrieve the keys is verified, and, upon verification, the keys are transmitted to a key requesting party in encrypted form based on an asymmetric encryption scheme employing the public key of the key requesting party.

Document US 2015/0350895 A1 describes a method of establishing secure communications between a first wireless communication device and a second wireless communication device for an instant messaging application. Herein, contact information representing a contact associated with the second wireless communication device is received at the first wireless communication device. It is determined from capability information included in the contact information, whether the second wireless communication device is capable of communicating using an enhanced encryption system. In response to determining that the second wireless communication device is capable of communicating, a protected communication session is established using an enhanced encryption scheme when receiving a pass phrase back from the second wireless communication device via the instant messaging application, the pass phrase being sent to the second wireless device in an out-of-band channel.

Document US 2007/0269041 A1 describes a message server accessible to individuals including a sender and a recipient. This message server comprises a memory configured to store one or more messages and encryption keys, a programmable circuit operatively connected to the memory and arranged to manage messages between at least one sender and at least one recipient. The programmable circuit is programmed to generate a first key associated with the sender, encrypt a message from the sender to the recipient using the first key, encrypt the first key with a second key, store the encrypted message and the encrypted first key, associate the encrypted message with a sender and a recipient, decrypt the encrypted first key using a key related to the second key, and decrypt the encrypted message using the first key. Herein, the message is encrypted on the message server, at least while not being accessed by the recipient or the sender.

In view of the above state of the art, it is desirable to provide an encryption system and a method capable to secure the privacy of any communication between a plurality of parties, even in case that a key is compromised.

SUMMARY

A first aspect of the present disclosure provides for an encryption device. In accordance with some illustrative embodiments herein, the encryption device comprises a communication interface configured to communicate with an associated separate communication device, which is used by a user of the encryption device for communicating in a communication network, a variable key generator configured to generate at least two keys, a memory configured to store keys that are either generated by the variable key generator and/or received at the communication interface, and an encryption component configured to successively use keys stored in the memory for encrypting a plaintext received at the communication interface and decrypting a ciphertext received at the communication interface. Accordingly, a with respect to the associated communication device separate device is provided, allowing to generate keys, encrypt plaintext and decrypt ciphertext at a device at a device that is not directly connected to a public communication network accessed by other communication devices. Thereby, the security of communications interchanged among plural communication devices in a public communication network may be increased.

In accordance with some illustrative embodiments of the first aspect, the variable key generator may be configured to generate a master key and a first encryption key. Accordingly, at least two keys may be generated in accordance with key diversification which allows limiting the vulnerability of secure communication to the master key on the encryption device, rather than the whole communication network. In accordance with some illustrative examples herein, the variable key generator may be configured to iteratively generate at least one subsequent encryption key on the basis of the master key and a previous key, starting in a first iteration with the first key, thereby allowing to dynamically generate keys in an easy manner.

In accordance with some illustrative embodiments of the first aspect, the variable key generator may be configured to generate multiple key pairs, each of which having a public key and a private key. Herein, the multiple key pairs may be assigned to multiple encryption devices participating in a communication over a public communication network. Alternatively, the multiple key pairs may be used for dynamically assigning one of the key pairs to encryption/decryption of messages received at the communication interface of the encryption device. In accordance with some illustrative examples herein, the multiple key pairs may have identifying quantities assigned thereto such that each key pair is uniquely identifiable. Furthermore, the communication interfaces may be configured to transmit the public keys of the multiple key pairs together with the assigned identifying quantities to at least one other encryption device of another party participating in a communication over a public communication network, wherein a plurality of encryption devices may be, for example, directly coupled via their respective communication interfaces for sharing the multiple key pairs together with the respective identifying quantities. In accordance with some other illustrative examples herein, the communication interface may be further configured to transmit at least one first subset of the generated key pairs to at least one other encryption device and to transmit only public keys of a second subset different from the at least one first subset to the at least one other encryption device. Accordingly, the encryption device may generate the public and private key pairs to be used by all encryption devices during sessions of communication between various communication systems in a public communication network. In accordance with a further illustrative example herein, the key pairs of the at least one first subset and of the second subset may have identifying quantities assigned thereto such that each key pair is uniquely identifiable. Furthermore, the encryption device is configured to provide the communication device with an identifying quantity assigned to a given key used by the encryption component. Accordingly, during a conversation between the associated communication device and at least one further communication device, the identifying quantities may indicate which keys to use for the various encryption devices participating in the conversation in encryption/decryption. Thereby, the identifying quantities allow keeping track on the usage of keys of generated key pairs. In this way, a dynamical encryption using multiple keys may be implemented in an easy way.

In accordance with some illustrative embodiments of the first aspect, the variable key generator may be configured to generate a predefined number of keys to be stored in the memory, the predefined number of keys being greater than two. Each of the generated keys may have an identifying quantity associated therewith such that each key is uniquely identifiable. Furthermore, the encryption component may be configured to select one of the keys stored in the memory on the basis of the identifying quantity of the selected key which fulfils a predetermined condition and to decrypt ciphertext received at the communication interface or to encrypt plaintext received at the communication interface on the basis of the selected key. In accordance with some illustrative examples, usage of keys out of a multitude of keys may be modulated accordingly on the basis of the predetermined conditions for encrypting plaintext and decrypting ciphertext, wherein a dynamical selection of keys is implemented.

In accordance with some illustrative embodiments of the first aspect, the variable key generator may be configured to successively generate at least one key when a predefined condition is fulfilled. In accordance with some illustrative examples herein, the predefined condition may be defined on the basis of a predetermined number of plaintexts received at the communication interface and/or a predefined time interval elapsed between two consecutive plaintexts received at the communication interface and/or a predefined time elapsed since the keys are stored in the memory and/or a predefined number of keys being used by the encryption device and/or a key being used a predefined number of times. For example, the order in which keys of a plurality of keys are selected may be determined on the basis of a predefined formula that is shared among the encryption devices when sharing the plurality of keys, wherein the formula allows to determine an identifying quantity assigned to a given key on the basis of a counting quantity indicating a number of plaintexts/ciphertexts being exchanged among the various communication devices and/or a time interval having elapsed between two consecutive plaintexts received at the communication interface and/or a time having elapsed since the keys are stored in the memory and/or a number of keys being used by the encryption device. Accordingly, a dynamical selection of keys out of a multitude of keys may be easily implemented.

A second aspect of the present disclosure provides for a communication system. In accordance with some illustrative embodiments herein, the communication system comprises the encryption device of the first aspect and the associated communication device used by a user for communicating in a communication network. The communication device comprises a first communication port adapted to transmit and receive data from the communication network, and a second communication port adapted to transmit and receive data from the encryption device. Herein, the associated communication device is adapted to transmit ciphertexts received at the first communication port via the second communication port to the encryption device and to transmit ciphertexts received at the second communication port via the first communication port to the communication network.

In accordance with some illustrative embodiments of the second aspect, at least one of the encryption device and the associated communication device may further comprise an output interface configured to present plaintext data to the user of the communication device.

In accordance with some illustrative embodiments of the second aspect, the associated communication device may further comprise an input interface for enabling the user of the communication device to enter plaintext data, the associated communication device being adapted to transmit entered plaintext data to the communication interface of the encryption device via the first communication port.

In accordance with some illustrative embodiments of the second aspect, the communication interface of the encryption device and the second communication port of the associated communication device may be provided as mating USB terminals or as RFID transceivers or the encryption device and the communication device may be implemented as wearable devices. In accordance with some other illustrative embodiments of the second aspect, the encryption device may be provided as a smart card and the second communication port may comprise a card reader mating with the smart card.

In accordance with some illustrative embodiments of the second aspect, the second communication port and the communication interface may be configured to communicate with each other via a wireless communication or a wired communication network.

A third aspect of the present disclosure provides for a method of exchanging encrypted data in a communication network. In accordance with some illustrative embodiments herein, the communication network may comprise at least a first communication device with an associated separate first encryption device and a second communication device with an associated separate second encryption device. The first communication device may be temporarily connectable with the associated first encryption device and the second communication device may be temporarily connectable with the associated second encryption device. According to some illustrative embodiments of the third aspect, the method comprises: connecting the first encryption device and the first communication device so as to allow data transfer between the first encryption device and the first communication device; communicating a first plaintext which is input into the first communication device to the first encryption device; upon receipt of the first plaintext at the first encryption device, encrypting the first plaintext on the basis of one key present at the first encryption device and generating at least one first ciphertext associated with the first plaintext; communicating the at least one first ciphertext to the first communication device; separating the first encryption device and the first communication device, such that data transfer between the first encryption device and the second encryption device is disabled; transmitting the at least one first ciphertext to the second communication device; upon receipt of the at least one first ciphertext at the second communication device, connecting the second encryption device and the second communication device so as to allow data transfer between the second encryption device and the second communication device; communicating the at least one first ciphertext to the second encryption device; upon receipt of the at least one first ciphertext at the second encryption device, decrypting the at least one first ciphertext on the basis of the at least one generated key provided to the other one of the first and second encryption devices for retrieving the first plaintext and communicating the retrieved first plaintext to the second communication device; and separating the second encryption device and the second communication device such that data transfer between the second encryption device and the second communication device is disabled.

In accordance with some more illustrative embodiments of the third aspect, the method may further comprise performing an initiation sequence prior to communicating the first plaintext, wherein the initiation sequence may comprise: initiating a conversation between the first communication device and the second communication device on behalf of at least one of the first and second communication devices; generating at least two keys by one of the first and second encryption devices; and providing at least one of the generated keys to the other one of the first and second encryption devices.

In accordance with some illustrative examples herein, generating of at least two keys may comprise generating a master key and a first key, both of which being provided to the other one of the first and second encryption devices. In accordance with some more illustrative examples herein, identifying quantities stored at each of the first and second encryption devices may be synchronized at each of the first and second encryption devices to a default common identifying quantity value. A second key may be generated on the basis of the master key and the first key at the second encryption device after communicating the first plaintext to the second communication device and the second encryption device may be provided with a second plaintext for encryption, wherein the second plaintext is encrypted with the second key. The identifying quantity may be changed in common at the first and second encryption devices and, during further decryption and encryption actions, keys may be iteratively generated on the basis of the master key and a previously generated key, starting with the second key, each time commonly amending the identifying quantities at the first and second encryption devices. Accordingly, the identifying quantity allows each encryption device to keep track on the number of iterations performed during diversification and any subsequent encryption key may be determined by any of the first and second encryption devices on the basis of the master key and the identifying quantity. A simple but non-limiting example of an identifying quantity may be given by a counting quantity that the encryption devices employ in a counting procedure that is commonly established during an initialization of the encryption devices prior to any exchange of communications.

In accordance with some other illustrative examples herein, generating at least two keys may comprise generating a plurality of key pairs, each of which having a public key and a private key. Furthermore, providing at least one of the generated keys to the other one of the first and second encryption devices may comprise providing a first subset of the generated plurality of key pairs to the other one of the communication devices, and providing only public keys of a second subset of key pairs different from the first subset to the other one of the first and second encryption devices. Alternatively, providing at least one of the generated keys to the other one of the first and second encryption devices may comprise generating key pairs having public and private keys at each of the first and second encryption devices, wherein each key pair has an identifying quantity assigned thereto such that each key pair is uniquely identifiable, and exchanging the generated public keys together with the identifying quantity among the first and second encryption devices.

In still other illustrative examples herein, generating of at least two keys may comprise generating a predefined number of keys, each of the predefined number of keys only being used once at each of the first and second encryption devices when generating one of a ciphertext and a plaintext.

BRIEF DESCRIPTION OF THE DRAWINGS

The above described illustrative embodiments and aspects of the present disclosure will be described with regard to the accompanying drawings in the detailed description below, wherein.

Figure 1:
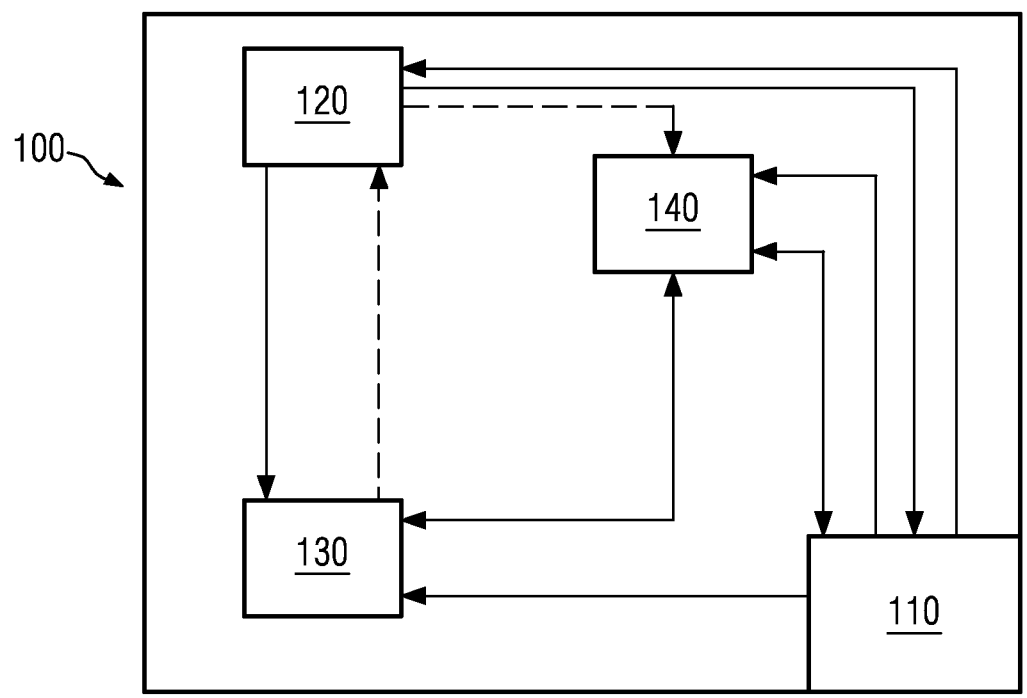
FIG. 1 schematically illustrates, in a block diagrammatic view, an encryption device in accordance with some illustrative embodiments of the present disclosure.

While the subject matter disclosed herein is susceptible to various modifications and alternative forms, specific embodiments thereof have been shown by way of example in the drawings and are herein described in detail.

It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It should be understood that the figures are not intended to illustrate features and elements with regard to a specific scale, unless a specific scale is specifically shown in the figures.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The drawings schematically show various structures, systems and devices for purposes of explanation only and not for obscuring the present disclosure with details known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase. It is pointed out that any enumeration, such as "a first device/structure/element/component/step/process/layer etc." does not necessarily indicate any prioritization or order, but may mainly denote an enumeration of devices/structures/elements/components/steps/processes/layers etc. that are mentioned, stated or described before at least one other device/structure/element/component/step/process/layer, etc. is mentioned, stated or described as "a second device/structure/element/component/step/process/layer etc." and so on.

With regard to FIG. 1, an encryption device 100 of some illustrative embodiments of the present disclosure will be described in greater detail. As illustrated in FIG. 1, the encryption device 100 comprises a communication interface 110, a variable key generator 120, a memory 130, and an encryption component 140.

As indicated in FIG. 1 by means of arrows, the communication interface 110 may receive signals from the variable key generator 120 and the encryption component 140, while outputting signals to the memory 130 and the encryption component 140. In accordance with some illustrative embodiments of the present disclosure, the communication interface 110 may be configured to communicate with an associated separate communication device (not illustrated) which is used by a user of the encryption device 100 for communicating with other communication devices (not illustrated) in a public communication network (not illustrated). In accordance with some illustrative but non-limiting examples herein the communication interface 110 may be implemented as an USB terminal, a RFID transceiver, or as an electrical contact or terminal.

The term "public communication network" relates to a communication network used by a plurality of parties for communication, the plurality of parties not being limited to an exclusive group of parties which intend to share secured messages among each other. In particular, the user of the encryption device and the parties with which the user intends to exchange secured messages only represent a subgroup of the totality of parties using the public communication network for exchanging communications. For example, the public communication network may be the internet, a telephone network, a computer network of a metropolitan area, a company, a campus network and the like. Thus, the term "public" may be understood as indicating that the communication network is not limited to a certain group of users that only intend to exchange secure messages only among each other.

As shown in FIG. 1, the variable key generator may be configured to output data to the communication interface 110 and the memory 130. In accordance with some illustrative embodiments of the present disclosure, the variable key generator 120 may be configured to generate at least two keys which may be provided to the memory 130 and/or the communication interface 110.

In accordance with some special illustrative examples herein, the variable key generator 120 may be configured to retrieve at least one key stored in the memory 130, generate a further key on the basis of the retrieved keys, and to output the generated further key to the encryption component 140. Furthermore, the variable key generator 120 may output the generated further key to the memory 130. This does not pose any limitation to the present disclosure and the person skilled in the art will appreciate that the variable key generator 120 may be configured to only output data to the memory 130 and the communication interface 110.

With regard to FIG. 1, the memory 130 may be coupled to the communication interface 110 and the variable key generator 120 so as to receive data provided by the communication interface 110 and the variable key generator 120, as indicated in FIG. 1 by arrows pointing towards the memory 130 from the communication interface 110 and the variable key generator 120. Furthermore, the memory 130 may be coupled with the encryption component 140 in the encryption device 100, such that an interchange of data between the memory 130 and the encryption component 140 is enabled. For example, the memory 130 may be configured to output keys that are stored in the memory 130 to the encryption component 140 upon the encryption component 140 requesting keys. Furthermore, the memory 130 may provide an identifying quantity associated with the requested key to the encryption component 140.

In accordance with some special illustrative, however, non-limiting examples, the memory 130 may be configured to output at least one key to the variable key generator 120 upon the variable key generator 120 requesting a key from the memory 130. Furthermore, the memory 130 may be configured to output an identifying quantity associated with the requested key to the variable key generator 120 (this situation is indicated in FIG. 1 by broken arrows). Alternatively, the memory 130 may be configured to only receive data from the communication interface 110 and the variable key generator 120 and to only interchange date with the encryption component 140.

Although it is not explicitly illustrated in FIG. 1, the encryption device 100 may further include a graphical user interface (not illustrated) that is configured to graphically display data processed by the encryption component 140 to a user of the encryption device 100. For example, the encryption device 100 may comprise a graphical display, such as a monitor or screen. Additionally or alternatively, the encryption device may have an audio output that outputs audio data to a user of the encryption device 100. Furthermore, the encryption device 100 may have a terminal (not illustrated) by means of which a graphical user interface and/or audio output may be coupled to the encryption device 100 such that data processed by the encryption component 140 may be graphically displayed and/or audio data may be output to a user of the encryption device 100 via an external graphical interface (not illustrated) and/or external audio output.

In accordance with some illustrative embodiments of the present disclosure, the variable key generator 120 may be configured to generate a master key and a first encryption key upon the communication interface 110 outputting a request signal to the variable key generator 120. For example, the communication interface 110 may be configured to output a key generation request signal to the variable key generator 120 upon the encryption device 100 being directly coupled to at least one further encryption device (not illustrated). Alternatively, user input means (not illustrated), such as a keyboard or touchscreen or any other interface allowing a user of the encryption device 100 to enter a request for activating the variable key generator 120 for generating and at least one key may be executed.

In accordance with some special illustrative examples herein, a request for activating the variable key generator 120 may be supplied to the variable key generator 120 upon operating the encryption device 100 for the first time. Additionally, or alternatively, a request causing activation of the variable key generator may be supplied to the variable key generator 120 in terms of a "reset signal", the reset signal triggering the variable key generator 120 to generate a master key and a first encryption key and to delete any key data that is possibly stored on the memory 130.

In accordance with some illustrative embodiments, the variable key generator may be further configured to iteratively generate at least one subsequent key on the basis of the master key and the first encryption key. For example, the variable key generator 120 may be configured to perform key diversification, e.g., on the basis of a cipher-based message authentication code (CMAC), which is a block cipher-based message authentication code algorithm which allows diversifying keys starting from a master key. Furthermore, the variable key generator may be configured to assign an identifying quantity to the generated encryption key that allows to uniquely identify the generated encryption key. Accordingly, the variable key generator 120 may keep track on iteratively generated keys based on the assigned identifying quantity. Subsequently, the variable key generator may supply the generated encryption key, together with the identifying quantity, to the encryption component and, optionally, to the memory 130. On the basis of the generated encryption keys, the encryption component may proceed to encrypt or decrypt any data provided to the encryption component 140 by the communication interface 110 for encryption/decryption. Subsequently, the encrypted/decrypted data may be supplied to the communication interface 110 by the encryption component 140.

In accordance with some illustrative examples, the encryption component 140 may be further configured to output the identifying quantity assigned to the encryption key used for encrypting plaintext into ciphertext to the communication interface 110 together with the encrypted ciphertext generated by the encryption component 140. For example, the identifying quantity may be encrypted with a public key provided to the encryption component 140 from the communication interface 110 and/or the memory 130, wherein the public key may be a public key that was assigned to a further encryption device (not illustrated) of a mating communication system (not illustrated).

In accordance with some other illustrative embodiments of the present disclosure, the variable key generator 120 may be configured to generate multiple key pairs, each key pair having a public key and a private key. For example, upon the variable key generator 120 receiving an "initiation signal" in an initiation process (will be described in greater detail below with regard to FIGS. 3a, 3b and 4), the variable key generator 120 may proceed to generate at least two key pairs, each of which key pair having a public key and a private key. In accordance with some illustrative examples herein, the initiation signal may be output by the communication interface 110 upon a further encryption device (not illustrated) being directly connected with the encryption device 100. The generated key pairs may be output to the memory 130. Additionally, the generated key pairs may be output to the communication interface 110.

In accordance with first illustrative examples herein, the multiple key pairs generated by the variable key generator 120 may be divided into a first subset of key pairs and at least one second subset of key pairs. The first subset and the at least one second subset may be mutually different. Herein, the first subset of key pairs may be provided to the memory 130, while the at least one second subset of key pairs may be supplied to the communication interface 110. In this case, the variable key generator 120 may generate key pairs for multiple encryption devices which are to be used in a public communication network. Accordingly, a subset of key pairs may be assigned and provided to each encryption device separately. Regarding the first subset of key pairs being stored in the memory 130, the public keys of these key pairs may be provided to the communication interface 110 by the variable key generator 120, together with identifying quantities assigned to the public keys of the first subset for uniquely identifying the public keys of the first subset. Similarly, the key pairs of each subset of key pairs may be uniquely identified and assigned to identifying quantities. The entirety of identifying quantities is further provided to the communication interface for which communicates the identifying quantities to the further directly connected encryption devices (not illustrated) as identifying quantity data. Accordingly, each encryption device of a communication network may identify the public keys of the subset of public keys provided to it, as well as the public keys provided to the encryption device from other encryption devices, in a way consistent with the other encryption devices.

In accordance with other illustrative examples, the variable key generator 120 may be configured to generate a predefined number of keys to be stored in the memory. Upon initiation, the predefined number of keys may be greater than two. In accordance with some illustrative examples herein, the predefined number of keys to be stored in the memory may be a list of keys together with identifying quantities associated with each key for uniquely identifying each key in the list of keys. Upon the communication interface 110 supplying a plaintext to the encryption component 140, the encryption component 140 may select one of the keys stored in the memory 130 and encrypt the plaintext on the basis of the selected key. Subsequently, the encrypted plaintext resulting in ciphertext is supplied to the communication interface 110. Upon the communication interface 110 receiving a ciphertext, the received ciphertext is supplied to the encryption component 140. Together with the received ciphertext, an identifying quantity may be received by the encryption component 140, the identifying quantity allowing the encryption component 140 to select the matching key from the keys stored in the memory 130. On the basis of the selected key, the encryption component 140 may proceed to decrypt the ciphertext, resulting in plaintext which may be supplied to the communication interface 110 and/or a graphical user interface (not illustrated). According to some illustrative examples herein, the identifying quantity supplied to the encryption component 140 may be encrypted with a public key assigned to the encryption device 100, e.g., a public key of a key pair generated by the variable key generator 120, thereby allowing the variable key generator 140 to decrypt the encrypted identifying quantity with the private key of the encryption device 100.

In accordance with some illustrative examples, the variable key generator may select a specific key stored in the memory 130 in accordance with a predefined condition upon receipt of a plaintext and/or ciphertext at the communication interface 110. For example, an order in which a key is selected out of a list of keys may be predefined upon the encryption device 100 being directly connected with at least one further encryption device (not illustrated), when an initiation process is performed. Additionally, or alternatively, keys may be selected upon a predefined time interval being elapsed since an initiation process is performed or a plaintext and/or ciphertext is received at the communication interface 110. Additionally, or alternatively, a predefined condition may relate to a number of plaintexts and/or ciphertexts received at the communication interface 110.

In accordance with some other illustrative embodiments of the present disclosure, the variable key generator may be configured to successively generate at least one key when a predefined condition is fulfilled.

In some of the illustrative embodiments, the predefined condition may be defined on the basis of a predetermined number of plaintexts and/or ciphertexts received at the communication interface and/or a predefined time interval having elapsed between two consecutive plaintexts and/or ciphertexts being received at the communication interface 110 and/or a predefined time interval having elapsed since keys are stored by the memory 130 and/or a predefined number of keys being used by the encryption device 100 and/or a key being used a predefined number of times.

Additionally or alternatively to at least some of the above described embodiments and examples of the present disclosure, the encryption device 100 of FIG. 1 may further comprise at least one of user input means (not illustrated), such as a keyboard or touchscreen or any other interface allowing a user of the encryption device 100 to enter a plaintext for encryption, and interface means (not illustrated) configured to connect the encryption device 100 with user input means (not illustrated). For example, the interface means may be adapted to connect the user input means (not illustrated) to at least of the components 110, 120, 130, 140 of the encryption device 100 with a wired or wireless connection. Accordingly, a plaintext for encryption or a cyphered text for decryption may be input to the encryption device via the user input means (not illustrated) which may be permanently or temporarily connected to the encryption device 100 by means of the interface means (not illustrated).

Additionally or alternatively to at least some of the above described embodiments and examples of the present disclosure, the encryption device 100 of FIG. 1 may further comprise user output means (not illustrated) which may be configured to present plaintext data to the user of the associated communication device 210, e.g., a graphical user interface (not illustrated) such as a display or monitor, or audio interface for outputting audio data to a user. The user output means (not illustrated) may be permanently or temporarily connected to the encryption device 100 by means of interface means (not illustrated), e.g., by a wired or wireless connection.

Figure 2:
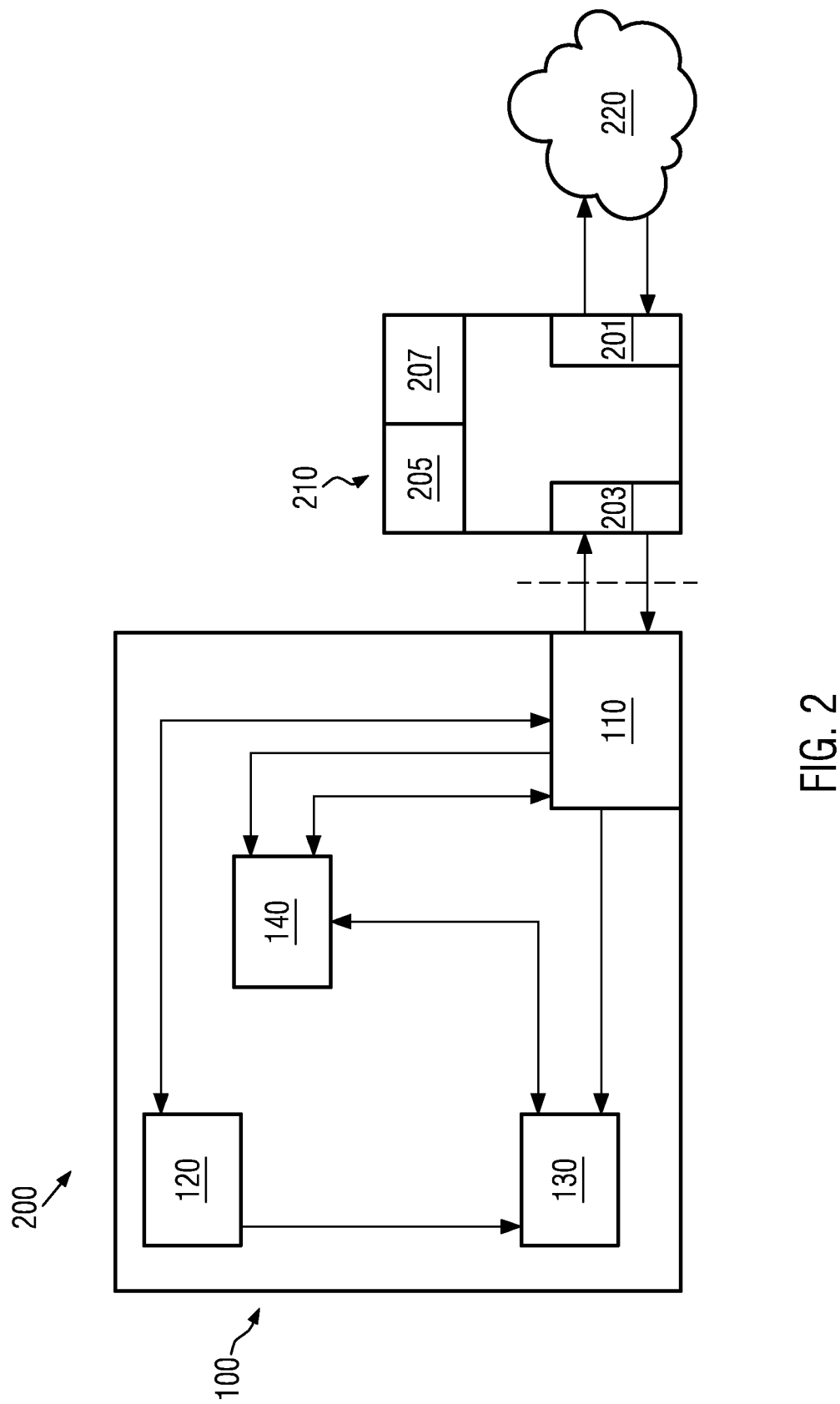
FIG. 2 schematically illustrates, in a block diagrammatic view, a communication system in accordance with some illustrative embodiments of the present disclosure.

With regard to FIG. 2, a communication system 200 will be described in greater detail. As shown in FIG. 2, the communication system 200 comprises the encryption device 100 as described above with regard to FIG. 1 and an associated communication device 210 which may be used by a user of the communication system 200 for communicating with other users via a communication network 220. The communication device 210 has a first communication port 201 and a second communication port 203, the first communication port 201 being adapted to transmit and receive data from the communication network 220 and the second communication port 203 being adapted to transmit and receive data from the encryption device 100.

According to some illustrative embodiments of the present disclosure, the associated communication device 210 is separate from the encryption device 100. That is, the associated communication device 210 may be temporarily connected to the encryption device 100, i.e., a communication between the communication interface 110 of the encryption device 100 and the second communication port 203 of the associated communication device 210 is temporarily permitted. This means that the associated communication device 210 and the encryption device 100 are at least electronically disconnected from each other and become connected when plaintext or ciphertext data is to be communicated among the encryption device 100 and the communication device 210. In accordance with some special illustrative examples herein, a mechanical connection between the encryption device 100 and the associated communication device 210 may be detached when separating the encryption device 100 and the communication device 210 such that no communication between the encryption device 100 and the associated communication device 210 is possible. Additionally or alternatively, at least one of the communication interface 110 and the second communication port 203 may be switched off such that any communication between the encryption device 100 and the associated communication device 210 is disabled. The separation between the encryption device 100 and the associated communication device 210 is indicated by broken line in FIG. 2.

In accordance with some illustrative embodiments of the present disclosure, the encryption device 100 is not able to directly access the communication network 220. Particularly, the communication interface 110 is not configured to allow any direct communication with the communication network 220 without the associated communication device 210.

Referring to FIG. 2, the associated communication device may be adapted to transmit ciphertext received at the first communication port 201 to the encryption device 100 via the second communication port 203. Furthermore, the associated communication device 210 may be adapted to transmit ciphertext received at the second communication port 203 to the communication network 220 via the first communication port 201.

In accordance with some illustrative embodiments of the present disclosure, the associated communication device 210 may be further configured to transmit a plaintext from the communication device 210 to the encryption device 100 via the second communication port 203.

In accordance with some illustrative embodiments of the present disclosure as illustrated in FIG. 2, the associated communication device 210 may further comprise an (optional) output interface 205 configured to present plaintext data to the user of the associated communication device 210. Additionally, or alternatively, an (optional) separate graphical user interface (not illustrated) may be connected with the associated communication device 210 for presenting plaintext data to a user of the communication device 210.

In accordance with some illustrative embodiments of the present disclosure as illustrated in FIG. 2, the communication device 210 may further comprise an (optional) input interface 207 for enabling the user of the communication device 210 to enter plaintext data. Furthermore, the communication device 210 may be adapted to transmit the entered plaintext data to the communication interface 110 of the encryption device 100 via the second communication port 203.

In accordance with some illustrative embodiments of the present disclosure, the communication interface 110 of the encryption device 100 and the second communication port 203 of the communication device 210 may be provided as mating USB terminals or as RFID transceivers or as wearable devices. In accordance with some other illustrative embodiments of the present disclosure, the encryption device 100 may be provided as a smart card, while the second communication port 203 of the communication device 210 may comprise a card reader which electronically and mechanically mates with the smart card.

In accordance with some illustrative embodiments of the present disclosure, the second communication port 203 of the communication device 210 and the communication interface 110 of the encryption device 100 may be configured to communicate with each other via wireless communication or via a wired communication. In accordance with some illustrative and non-limiting examples herein, a communication between the communication device 210 and the encryption device 100 may be established via WPS or a direct cable connection.

Further features regarding different configurations and modes of operation of the encryption device 100 and the communication system 200 will be described with regard to FIGS. 3a, 3b, 4, 5 and 6.

With regard to FIGS. 3a and 3b, an initiation process will be described, which initiation process is performed by three encryption devices 100A, 100B and 100C. This does not pose any limitation to the present disclosure and the person skilled in the art will appreciate that any number of encryption devices may be subjected to an initiation process.

Figure 3A:
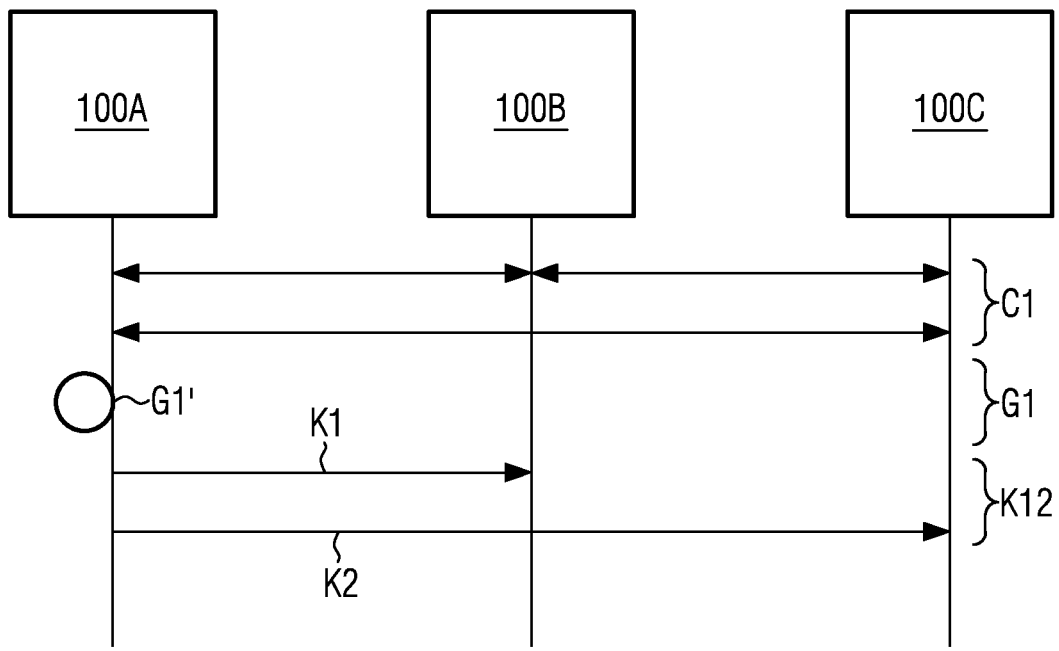
FIGS. 3a and 3b schematically illustrate signal flow diagrams of an initiation process preformed among three encryption devices in accordance with some illustrative embodiments of the present disclosure.

FIG. 3a shows a signal flow diagram of an initiation process in accordance with some illustrative embodiments of the present disclosure. The encryption devices 100A to 100C that are subjected to the initiation process may represent encryption devices of a communication system (not illustrated) in which users of communication devices (not illustrated) may communicate with each other over a communication network (not illustrated). A communication among the users of the encryption devices may be a single communication or exchange of data among the users, or may represent a repeated exchange of data or conversation among the users of the encryption devices. Prior to any exchange of data among the users of the encryption devices, the encryption devices 100A to 100C are directly connected with each other. This may be performed by simultaneously or consecutively connecting the encryption devices 100A to 100C with each other.

With regard to FIG. 3a, a connection of the encryption devices 100A to 100C may be achieved by directly connecting the encryption devices 100A to 100C with each other, as indicated in FIG. 3a by reference numeral C1 showing a connection phase where interconnections between the encryption devices 100A to 100C are indicated by double arrows. For example, one of the encryption devices 100A to 100C may be simultaneously connected with the other encryption devices of the encryption devices 100A to 100C. Alternatively, one of the encryption devices 100A to 100C may be consecutively connected with the other ones of the encryption devices 100A to 100C. Upon at least two of the encryption devices 100A to 100C being directly connected (FIG. 3a shows double arrows for direct connection), one of the directly connected encryption devices, in the illustration of FIG. 3a the encryption device 100A, is depicted as being selected as a host device (this does not pose any limitation in the present disclosure and any other of the encryption devices 100A to 100C may be selected as a host device). The encryption device 100A may thus proceed after the connection phase C1 with a generation phase G1 in which a generation process G1' is performed. In the generation process G1', the variable key generator (not illustrated) in FIG. 3a of the encryption device 100A is activated and generates at least two keys as described above with regard to FIGS. 1 and 2.

Subsequently, the encryption device 100A outputs the generated keys which are to be distributed among the other encryption devices (e.g., public keys and/or master keys and/or public/private key pairs) participating in the initiation process. Herein, the encryption device 100A outputs key signals K1 and K2 to each of the other encryption devices 100B and 100C. The key signals K1 and K2 may be simultaneously or consecutively output to the other encryption devices 100B and 100C in a key distribution phase K12.

Figure 3B:
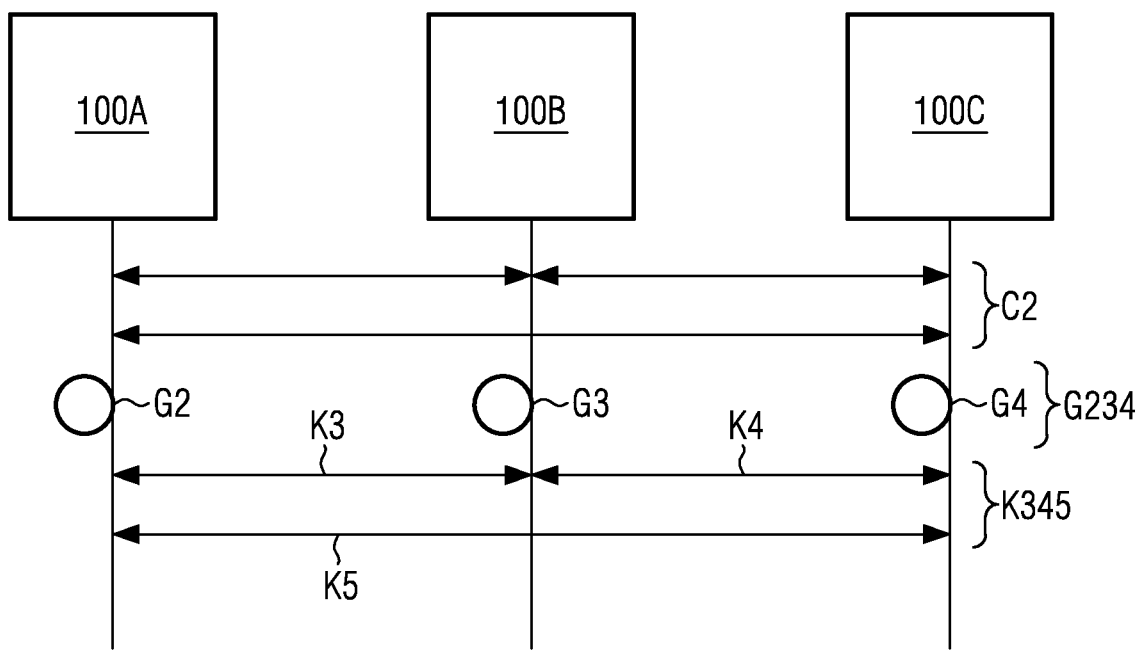

With regard to FIG. 3b, some other illustrative embodiments of an initiation process are illustrated in a signal flow diagram. Herein, after a connection phase C2 is performed (in which the encryption devices 100A to 100C are directly coupled to each other, either simultaneously or consecutively), each of the encryption devices 100A to 100C participates in a generation phase G234 in which the variable key generator of each of the encryption devices 100A to 100C is activated for generating keys and keys are generated. That is, a generation process G2 is performed by the variable key generator (not illustrated) of the encryption device 100A, a generation process G3 is performed by the variable key generator (not illustrated) of the encryption device 100B and the encryption device 100C performs a generation process G4 via its variable key generator (not illustrated).

In accordance with some illustrative examples herein, in each of the generation processes G2 to G4, a plurality of public/private key pairs may be generated in each of the encryption devices 100A to 100C. Subsequently, the public keys generated in each of the generation processes G2 to G4 may be exchanged among the encryption devices 100A to 100C by a simultaneous or consecutive exchange of data among the encryption devices 100A to 100C during a key distribution phase K345. For example, public keys generated in the generation processes G2 and G3 may be exchanged by the encryption devices 100A to 100B via a key exchange process K3, while the public keys generated by the generation processes G3 and G4 are interchanged among the encryption devices 100B and 100C via a key exchange process K4, while the public keys generated in the generation processes G2 and G4 are exchanged among the encryption devices 100A and 100C via a key exchange process K5.

Alternatively, each of the encryption devices 100A to 100C may generate a predefined number of keys in the respective generation processes G2 to G4. Subsequently, the generated keys may be distributed among the encryption devices 100A to 100C in the key exchange phase K345, such that each of the encryption devices 100A to 100C may possess the entirety of keys generated in the key generation phase G234. For example, upon generating keys in each of the generation processes G2 to G4, a unique identifying quantity, e.g., a quantity identifying the respective one of the encryption devices 100A to 100C may be assigned to each generated key, each identifying quantity uniquely identifying an associated one of generated keys. Accordingly, each key of the generated entirety of keys may be uniquely identified. In this case, the key exchange processes K3, K4 and K5 comprise a key signal containing a single key together with its identifying quantity. Alternatively, a synchronization step may be performed after the distribution of the keys among the encryption devices 100A to 100C for synchronizing an assignment of identifying quantities to the entirety of keys at each of the encryption devices 100A to 100C.

In accordance with some other illustrative embodiments, each of the encryption devices 100A to 100C may generate, in each of the generation processes G2 to G4, a dedicated master key together with a dedicated first encryption key. Subsequently, the master and first encryption keys may be distributed among the encryption devices 100A to 100C and each of the master key/first encryption key pairs may be identified with an identifying quantity. Accordingly, each of the encryption devices 100A to 100C may subsequently generate subsequent encryption keys in an interactive manner on the basis of the master key. Upon identifying the master key, e.g., by assigning an identifying quantity to the master key on the basis of the encryption device generating the master key, together with an identifier identifying the iteration step of a diversification process employed for generating new encryption keys, each of the encryption devices 100A to 100C is able to determine subsequent encryption keys to be used during encryption and decryption.

In accordance with some illustrative embodiments, each of the encryption devices 100A to 100C may further generate an additional private/public key pair which may be used for an encrypted communication among the encryption devices 100A to 100C during the initiation phase. This may add a further protection to secure the exchange of keys despite the direct communication of the encryption devices 100A to 100C.

Alternatively or additionally, the direct connection of the encryption devices 100A to 100C may be an exclusive direct connection among the encryption devices 100A to 100C without using a public communication network in between the encryption devices 100A to 100C. For example, the encryption devices 100A to 100C may be brought together for the initiation process, such that the users of the encryption devices 100A to 100C physically meet for the initiation process.

Figure 4:
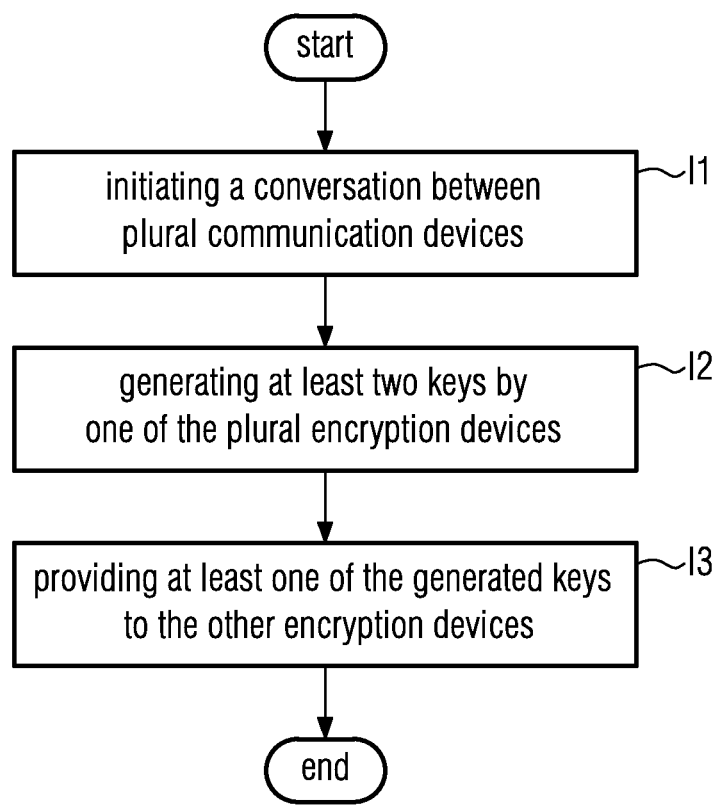
FIG. 4 schematically illustrates a flow diagram of a process for initiating a communication among plural communication devices in accordance with some illustrative embodiments of the present disclosure.

With regard to FIG. 4, a flow diagram of the initiation process described above with regard to FIGS. 3a and 3b is schematically illustrated.

At step I1 of an initiation process, a conversation between the plural communication devices may be initiated. For example, handshake signals may be exchanged among the participating encryption devices.

Subsequently, at least one of the plural participating encryption devices may generate at least two keys in a step I2. In accordance with some illustrative examples herein, one or more further encryption devices may additionally generate one or more additional keys, while in accordance with some other illustrative examples herein, it may be only one of the plural encryption devices that may generate at least two keys to be used by any of the encryption devices participating in a conversation.

Subsequently, at least one of the generated keys may be provided to the other encryption devices participating in the initiation process. For example, the at least one encryption device generating at least two keys may distribute the generated keys among all the other encryption devices. Accordingly, all the encryption devices of the plurality of encryption devices may share at least one common key.

With regard to FIGS. 5 and 6, an exchange of encrypted data in a public communication network having a plurality of communication systems participating in a conversation will be described. Herein, each of the participating communication systems may be provided on the basis of a communication system as described above with regard to FIG. 2. Furthermore, each encryption device of a communication systems participating in the conversation may be initiated in accordance with an initiation process as described above with regard to FIGS. 3a, 3b and 4.

Figure 5:
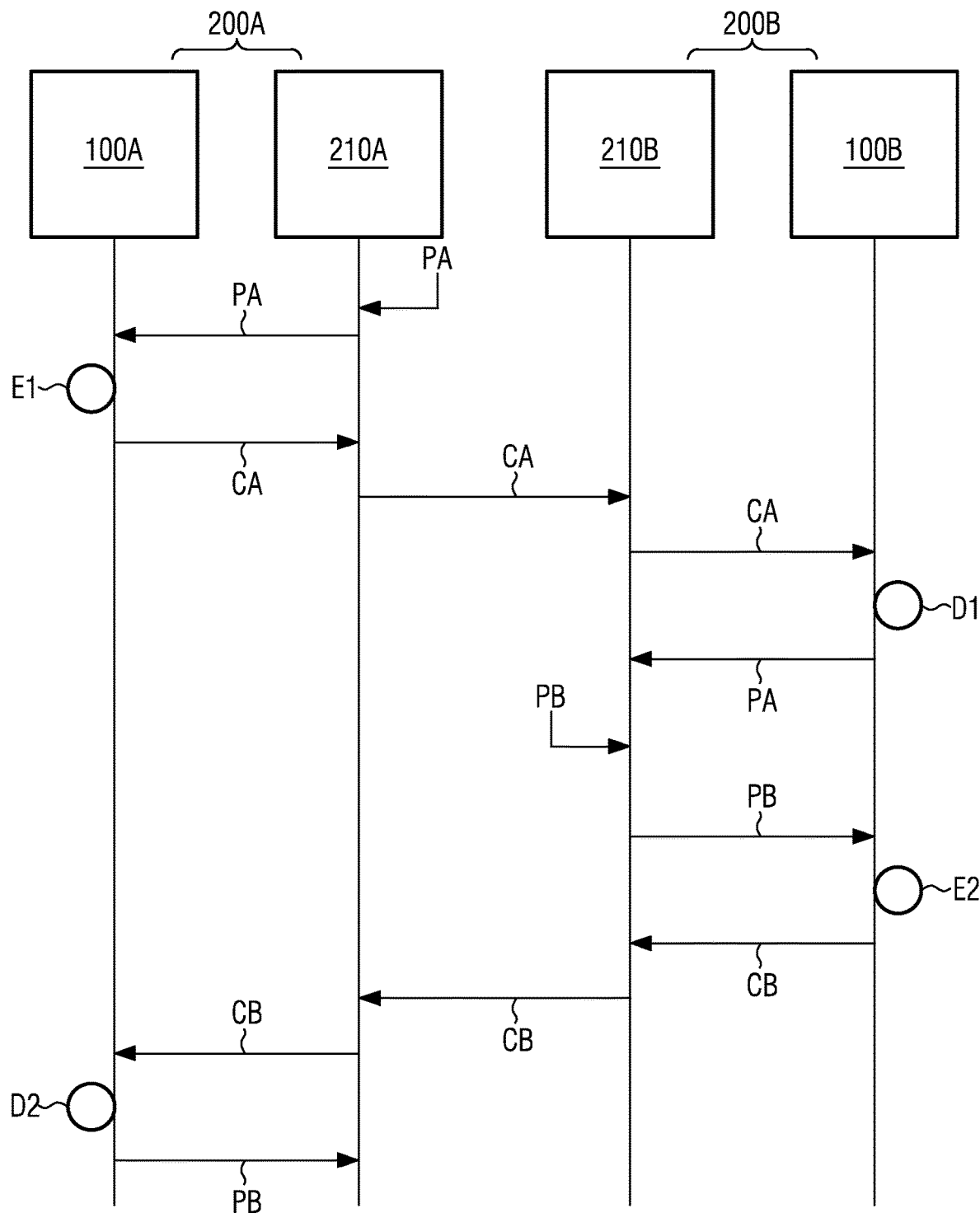
FIG. 5 schematically illustrates a signal flow diagram in accordance with some illustrative embodiments of the present disclosure.
Figure 6:
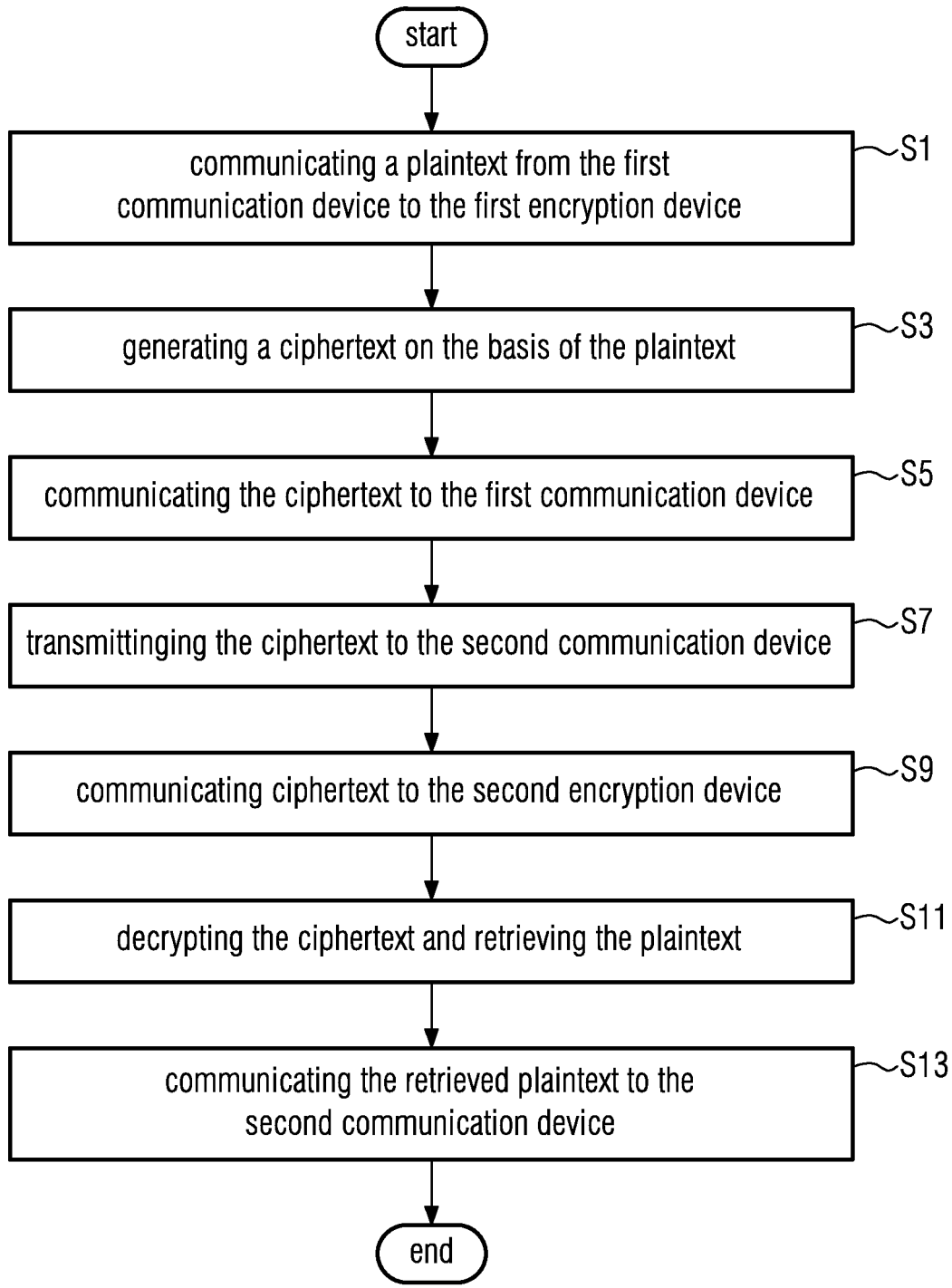
FIG. 6 schematically illustrates a flow diagram of a communication among a first and second communication device in accordance with some illustrative embodiments of the present disclosure.

Referring to FIG. 5, a conversation among two communication systems is schematically illustrated by means of a signal flow diagram. Although two communication systems 200A and 200B are explicitly illustrated in FIG. 5, this does not pose any limitation to the present disclosure and the person skilled in the art will appreciate that more than two communication systems may be present.

FIG. 5 schematically shows a conversation between a first communication system 200A and a second communication system 200B. The first communication system 200A has a first encryption device 100A and a first communication device 210A. Similarly, the second communication system 200B has a second encryption device 100B and a second communication device 110B. For the sake of brevity, an initiation process performed among the encryption devices 100A and 100B is not described in greater detail, however, reference is made to the initiation processes described above with regard to FIGS. 3a, 3b and FIG. 4, the description of which is not repeated at this stage.

In accordance with some illustrative embodiments of the present disclosure, a user of the first communication system 200A begins a conversation by inputting a plaintext PA into the first communication device 210A or via an external user input device. For example, the plaintext PA may be entered via a keyboard or some other user input interface (not illustrated), such as a microphone, an optical scanning element, a push button, a touch screen and the like.

Subsequently, the first communication device 210A may establish a connection with the first encryption device 100A. For example, the user of the first communication system 200A may actively connect the first communication device 210A to the first encryption device 100A. Alternatively, this communication may be established automatically by the first communication device 210A. In addition, the first communication device 210A may disable any communication of the first communication device 210A with a communication network (not illustrated) used for communication between the first and second communication devices 210A and 210B.

Subsequently, the plaintext PA may be transmitted to the first encryption device 100A. In accordance with some illustrative embodiments herein, the plaintext PA may be transmitted to the first encryption device 100A as plaintext data or, alternatively, as encrypted data by using an encryption scheme that is only established for the communication between the first communication device 210A and the first encryption device 100A. In accordance with a special, but non-limiting, example of the present embodiment, the plaintext PA may be encrypted with a public key assigned to the first encryption device 100A.

Subsequently, the encryption device 100A may perform a first encryption process E1 for encrypting the plaintext PA and generating a ciphertext CA on the basis of the plaintext PA and a key stored at the first encryption device 100A. In accordance with some special illustrative examples herein, any communication between the first communication device 210A and the first encryption device 100A may be disabled before the first encryption process E1 is started. After completion of the encryption process E1, a communication between the first communication device 210A and the first encryption device 100A may be reestablished.

After completion of the first encryption process E1, the generated ciphertext CA may be transmitted to the first communication device 210A. In accordance with some special illustrative examples herein, the plaintext PA may be deleted after the ciphertext CA is generated and before a communication with the first communication device 210A is established.

In accordance with some illustrative embodiments of the present disclosure, the first communication device 210A may delete the plaintext PA from its memory after having successfully transmitted the plaintext PA to the first encryption device 100A. Alternatively, the plaintext PA may be deleted from the memory of the first communication device 210A prior to receiving the ciphertext CA from the first encryption device 100A.

Subsequently, the received ciphertext CA is transmitted to the second communication device 210B. In accordance with some illustrative embodiments herein, the first communication device 210A may establish a communication connection with the second communication device 210B via a communication network (not illustrated). For example, the first communication device 210A and the second communication device 210B may exchange a handshake signal for establishing a communication connection between the first communication device 210A and the second communication device 210B. In accordance with some special illustrative examples herein, the first communication device 210A may disable any communication, i.e., data transfer and connection, between the first encryption device 100A and the first communication device 210A prior to establishing a communication with a communication network (not illustrated).

After having received the ciphertext CA, the second communication device 210B may establish a communication with the second encryption device 100B. In accordance with some special illustrative examples herein, the second communication device 210B may disable any communication with the communication network (not illustrated).

Subsequently, the second encryption device 100B may perform a first decryption process D1 for decrypting the ciphertext CA and retrieving the plaintext PA.

Subsequently, the second encryption device 100B may transmit the retrieved plaintext PA to the second communication device 210B. In accordance with some special illustrative examples herein, any communication between the second communication device 210B and the second encryption device 100B may be disabled during the decryption process D1.

After having received the plaintext PA, the second communication device 210B may disable any communication with the second encryption device 100B and display the plaintext PA to a user of the second communication system 200B via a graphical user interface (not illustrated). Additionally, or alternatively, the plaintext PA may be output to a user via an audible user interface.

Furthermore, the user of the second communication system 200B may respond to the communication received from the first communication system 200A. In accordance with some illustrative embodiments of the present disclosure, the user of the second communication system 200B may continue the conversation by inputting a plaintext PB as a response to the plaintext PA received from the first communication system 200A into the second communication device 210B or via an external user input device. For example, the plaintext PB may be entered via a keyboard or some other user input interface (not illustrated), such as a microphone, an optical scanning element, a push button, a touch screen and the like.

Subsequently, the second communication device 210B may establish a connection with the second encryption device 100B. For example, the user of the second communication system 200B may actively connect the second communication device 210B to the second encryption device 100B. Alternatively, this communication connection may be established automatically by the second communication device 210B. In addition, the second communication device 210B may disable any communication of the second communication device 210B with a communication network (not illustrated) used for communication between the first and second communication devices 210A and 210B.

Subsequently, the plaintext PB may be transmitted to the second encryption device 100B. In accordance with some illustrative embodiments herein, the plaintext PB may be transmitted to the second encryption device 100B as plaintext data or, alternatively, as encrypted data by using an encryption scheme that is only established for the communication between the second communication device 210B and the second encryption device 100B. In accordance with a special, but non-limiting, example of the present embodiment, the plaintext PB may be encrypted with a public key assigned to the second encryption device 100B.

Subsequently, the second encryption device 100B may perform a second encryption process E2 for encrypting the plaintext PB and generating a ciphertext CB on the basis of the plaintext PB and a key stored at the second encryption device 100B. In accordance with some special illustrative examples herein, any communication between the second communication device 210B and the second encryption device 100B may be disabled before the second encryption process E2 is started. After completion of the second encryption process E, a communication between the second communication device 210B and the second encryption device 100B may be reestablished.

After completion of the second encryption process E2, the generated ciphertext CB may be transmitted to the second communication device 210B. In accordance with some special illustrative examples herein, the plaintext PB may be deleted after the ciphertext CB is generated and before a communication with the second communication device 210B is established.

In accordance with some illustrative embodiments of the present disclosure, the second communication device 210B may delete the plaintext PB from its memory after having successfully transmitted the plaintext PB to the second encryption device 100B. Alternatively, the plaintext PB may be deleted from the memory of the second communication device 210B prior to receiving the ciphertext CB from the second encryption device 100B.

Subsequently, the received ciphertext CB is transmitted to the first communication device 210A. In accordance with some illustrative embodiments herein, the second communication device 210B may establish a communication connection with the first communication device 210A via a communication network (not illustrated). For example, the second communication device 210B and the first communication device 210A may exchange a handshake signal for establishing a communication connection between the second communication device 210B and the first communication device 210A. In accordance with some special illustrative examples herein, the second communication device 210B may disable any communication, i.e., data transfer and connection, between the second encryption device 100B and the second communication device 210B prior to establishing a communication with a communication network (not illustrated).

After having received the ciphertext CB, the first communication device 210A may establish a communication with the first encryption device 100A. In accordance with some special illustrative examples herein, the first communication device 210A may disable any communication with the communication network (not illustrated).

Subsequently, the first encryption device 100A may perform a second decryption process D2 for decrypting the ciphertext CB and retrieving the plaintext PB.

Subsequently, the first encryption device 100A may transmit the retrieved plaintext PB to the first communication device 210A. In accordance with some special illustrative examples herein, any communication between the first communication device 210A and the first encryption device 100A may be disabled during the second decryption process D2.

After having received the plaintext PB, the first communication device 210A may disable any communication with the first encryption device 100A and display the plaintext PB to a user of the first communication system 200A via a graphical user interface (not illustrated). Additionally, or alternatively, the plaintext PB may be output to a user via an audible user interface.

In accordance with some illustrative embodiments of the present disclosure, each of the first and second encryption devices 100A and 100B may have a master key and at least one encryption key stored thereon. In the first encryption process E1, a subsequent encryption key may be generated on the basis of the master key and the previous encryption key, together with an identifying quantity indicating an iterative stage in the diversification. The ciphertext CA may further be transmitted to the second encryption device 100B via the first and second communication devices 210A, 210B together with the identifying quantity to indicate to the second encryption device 100B the stage during the iterative diversification on the basis of the master key. In accordance with some illustrative examples herein, the identifying quantity may be encrypted data, e.g., data that is encrypted via a public key of the second encryption device 100B generated during an initiation process subjected to the first and second encryption devices 100A and 100B before any conversation between the first and second communication systems 200A and 200B as described with regard to FIGS. 3a, 3b and 4. In accordance with some special illustrative examples herein, the public key used for encrypting identifying quantities in the first encryption process E1 may be selected from a plurality of public keys of the second encryption device 100B in accordance with some predetermined conditions and in accordance with some predetermined selection rules established during the initiation process. Accordingly, a level of security in the communication between the first and second communication systems 200A and 200B may be increased.

In accordance with some alternative embodiments of the present disclosure, the first and second encryption devices 100A and 100B may have a plurality of keys stored thereon, and the encryption/decryption processes performed by the first and second encryption devices 100A and 100B are based on a symmetric encryption technique. Herein, each of the first and second encryption devices 100A and 100B may select keys from the plurality of keys stored on the respective encryption devices 100A and 100B in accordance with a predefined selection rule and/or condition. Additionally, or alternatively, an identifying quantity may be exchanged among the first and second encryption devices 100A and 100B together with ciphertext, the identifying quantity indicating a key in the plurality of keys stored in each of the memories of the first and second encryption devices 100A and 100B. The identifying quantities may be encrypted as described in the previous section.

In accordance with some illustrative embodiments of the present disclosure, the identifying quantity may be determined on the basis of a predefined selection rule, such as a predefined condition being fulfilled, as established during the initiation process.

With regard to FIG. 6, a method of exchanging encrypted data in a communication network comprising the first and second communication systems 200A and 200B of FIG. 5 will be described.

In a step S1, a plaintext is communicated from the first communication device 210A to the first encryption device 100A. As described above, the plaintext may be entered by a user as a plaintext PA at the first communication device 210A.

In a step S3, a ciphertext may be generated on the basis of the plaintext. For example, the ciphertext may be generated during the first encryption process E1 as described above with regard to FIG. 5.

In a step S5, the ciphertext may be communicated to the first communication device 210A.

Subsequently, the ciphertext may be transmitted from the first communication device 210A to the second communication device 210B. This is for example indicated by the arrow CA between the first and second communication devices 210A and 210B in the signal flow diagram of FIG. 5.

Subsequently, the ciphertext may be transferred to the second encryption device in step S9.

Subsequently, in step S11, the ciphertext may be decrypted at the second encryption device 100B and the plaintext may be retrieved when performing the first decryption process D1.

In step S13, the retrieved plaintext is subsequently communicated to the second communication device 210B.

In accordance with some illustrative embodiments herein, the first encryption device 100A and the first communication device 210A may be separated such that the transfer between the first encryption device 100A and the second encryption device 110A is disabled after communicating the ciphertext from the first encryption device 100A to the first communication device 210A after the first encryption process E1 is completed.

In accordance with some illustrative embodiments herein, the second encryption device 100B and the second communication device 110B are connected so as to allow data transfer between the second encryption device 110B and the second communication device 210B upon receipt of the first ciphertext at the second communication device 210B.

In accordance with some illustrative embodiments of the present disclosure, the second encryption device 100B and the second communication device 210B are separated such that data transfer between the second communication device 210B and the second encryption device 100B is disabled after the plaintext PA was transmitted to the second communication device 210B after the first decryption process D1 is completed.

In accordance with some illustrative embodiments, for each of the encryption processes E1 and E2 and the decryption processes D1 and D2, an encryption key may be generated on the basis of a master key and a previous key upon plaintext or ciphertext being received at the respective encryption device 100A and 100B. In this case, the identifying quantity may be a counter-quantity which may be increased at each of the encryption devices 100A and 100B upon generation of a new encryption key.

In accordance with some illustrative embodiments of the present disclosure, identifying quantities may be forwarded to each encryption device not participating in the conversation. Each of the encryption devices not participating in the conversation may store the identifying quantity that this encryption device is provided with for keeping track of the keys used by the first and second communication systems 200A and 200B. Accordingly, the communication devices, including the first and second communication devices 210A and 210B, may be configured to transmit an identifying quantity received at the communication device to its dedicated encryption device upon receipt of the identifying quantity. For example, the communication device may be configured to disable any communication between the communication device and the communication network after having received an identifying quantity, establishing a communication between the communication device and its dedicated encryption device after communication with the communication network is disabled between the communication device and the communication network, transmitting the received identifying quantity to the encryption device, and disabling any communication between the communication device and its dedicated encryption device. In accordance with some examples, the identifying quantities may be distributed among the encryption devices in an encrypted manner as described above.

In accordance with some illustrative embodiments of the present disclosure, an initialization process may be repeated after a certain condition is fulfilled. For example, after a certain amount of keys being generated and/or used in conversations between various communication systems, it may be necessary to perform another initialization process. Alternatively, or additionally, an initialization process may be performed after a given time interval has elapsed between a previously performed initialization.

In summary, with regard to the FIGS. 1 to 6, the following embodiments are explicitly disclosed.

In accordance with first embodiments of the present disclosures, the encryption device 100, 100A comprises the communication interface 110 configured to communicate with the associated separate communication device 210, 210A which may be used by a user of the encryption device 100 for communicating in the communication network 220, the variable key generator 120 configured to generate at least two keys, the memory 130 configured to store keys that are either generated by the variable key generator 120 and/or received at the communication interface 110, and the encryption component 140 configured to successively use keys stored in the memory 130 for encrypting the plaintext PA received at the communication interface 110 and for decrypting the ciphertext CB received at the communication interface 110.

In accordance with second embodiments of the present disclosure, the encryption device 100, 100A of the first embodiments may be implemented such that the variable key generator 120 is configured to generate a master key and a first encryption key.

In accordance with third embodiments of the present disclosure, the encryption device 100, 100A of the second embodiments may be implemented such that the variable key generator 120 is configured to iteratively generate at least one subsequent encryption key on the basis of the master key and a previous key, starting in a first iteration with the first key.

In accordance with fourth embodiments of the present disclosure, the encryption device 100, 100A of the first embodiments may be implemented such that the variable key generator 120 is configured to generate multiple key pairs, each having a public key and a private key.

In accordance with fifths embodiments of the present disclosure, the encryption device 100, 100A of the fourth embodiments may be implemented such that the multiple key pairs have identifying quantities assigned thereto such that each key pair is uniquely identifiable. Furthermore, the communication interface 110 may be configured to transmit the public keys of the multiple key pairs together with the assigned identifying quantities to at least one further encryption device 100B, 100C.

In accordance with sixths embodiments of the present disclosure, the encryption device 100, 100A of the fourth embodiments may be implemented such that the communication interface 110 is further configured to transmit at least one first subset of the generated key pairs and only public keys of a second subset to at least one further encryption device 100B, 100C. Herein, the second subset and the at least one first subset are mutually different.

In accordance with sevenths embodiments of the present disclosure, the encryption device 100, 100A of the sixths embodiments may be implemented such that the key pairs of the at least one first subset and of the second subset have identifying quantities assigned thereto such that each key pair is uniquely identifiable. Herein, the encryption device 100, 100A is further configured to provide the associated communication device 210, 210A with an identifying quantity assigned to a given key used by the encryption component 100, 100A.

In accordance with eights embodiments of the present disclosure, the encryption device 100, 100A of the first embodiments may be implemented such that the variable key generator 120 is configured to generate a predefined number of keys to be stored in the memory 130, the predefined number of keys being greater than two. Herein, each of the generated keys has an identifying quantity associated therewith such that each key is uniquely identifiable and the encryption component 140 is further configured to select one of the keys stored in the memory 130 on the basis of the identifying quantity of the selected key fulfilling a predetermined condition and, on the basis of the selected key, to decrypt the ciphertext (CB) received at the communication interface 110 or encrypt the plaintext (PA) received at the communication interface 110.

In accordance with ninths embodiments of the present disclosure, the encryption device 100, 100A of one of the first to eights embodiments may be implemented such that the variable key generator 120 is configured to successively generate at least one key, when a predefined condition is fulfilled, the predefined condition being defined on the basis of a predetermined number of plaintexts received at the communication interface 110 and/or a predefined time interval elapsed between two consecutive plaintexts received at the communication interface 110 and/or a predefined time elapsed since keys are stored by the memory 130 and/or a predefined number of keys being used by the encryption device 100, 100A and/or a key being used a predefined number of times.

In accordance with tenths embodiments of the present disclosure, the communication system 200 comprises the encryption device 100, 100A of one of the first to ninths embodiments, and the associated communication device 210; 210A which is used by a user for communicating in the communication network 220. The communication device 210, 210A has the first communication port 201 adapted to transmit and receive data from the communication network 220 and the second communication port 203 adapted to transmit and receive data from the encryption device 100, 100A. Herein, the associated communication device 210, 210A is adapted to transmit the ciphertext CB received at the first communication port 201 to the encryption device 100, 100A via the second communication port 203 and to transmit the ciphertexts CA received at the second communication port 203 to the communication network 220 via the first communication port 201.

In accordance with elevenths embodiments of the present disclosure, the communication system 200 of the tenths embodiments may be implemented such that at least one of the encryption device 100, 100A and the associated communication device 210, 210A further comprises an output interface configured to present plaintext data to the user of the associated communication device 210, 210A.

In accordance with twelfths embodiments of the present disclosure, the communication system 200 of the tenths or elevenths embodiments may be implemented such that the associated communication device 210, 210A further comprises an input interface for enabling the user to enter plaintext data. Herein, the associated communication device 210, 210A is adapted to transmit the entered plaintext data PA to the communication interface 110 of the encryption device 100, 100A via the second communication port 203.

In accordance with thirteenths embodiments of the present disclosure, the communication system 200 of one of the tenths to twelfths embodiments may be implemented such that the communication interface 110 of the encryption device 100, 100A and the second communication port 203 of the associated communication device 210, 210A are provided as mating USB terminals or as RFID transceivers or as wearable devices.

In accordance with fourteenths embodiments of the present disclosure, the communication system 200 of one of the tenths to twelfths embodiments may be implemented such that the encryption device 100, 100A is provided as a smart card and the second communication port 203 comprises a card reader mating with the smart card.

In accordance with fifteenths embodiments of the present disclosure, the communication system 200 of one of the tenths to twelfths embodiments may be implemented such that the second communication port 203 and the communication interface 110 are configured to communicate with each other via wireless communication or a wired communication network.

In accordance with sixteenths embodiments of the present disclosure, method of exchanging encrypted data in a communication network 220 is provided. Herein, the communication network 220 comprises at least the first communication device 210A with its associated separate first encryption device 100A and the second communication device 210B with its associated separate second encryption device 100B, the first communication device 210A being temporarily connectable with the associated first encryption device 100A and the second communication device 210B being temporarily connectable with the associated second encryption device 100B. The method comprises an initiation process comprising initiating a conversation between the first communication device 210A and the second communication device 210B on behalf of at least one of the first and second communication devices 210A, 210B, generating at least two keys by one of the first and second encryption devices 100A, 100B, providing at least one of the generated keys to the other one of the first and second encryption devices 100A, 100B. Furthermore, the method comprises, during a conversation, connecting the first encryption device 100A and the first communication device 210A so as to allow data transfer between the first encryption device 100A and the first communication device 210A, communicating the first plaintext PA which is input into the first communication device 210A, to the first encryption device 100A, upon receipt of the first plaintext PA at the first encryption device 100A, encrypting the first plaintext PA on the basis of one key present at the first encryption device 100A and generating at least one first ciphertext CA associated with the first plaintext PA, communicating the at least one first ciphertext CA to the first communication device 210A, separating the first encryption device 100A and the first communication device 210A such that data transfer between the first encryption device 100A and the second encryption device 100B is disabled, transmitting the at least one first ciphertext CA to the second communication device 210B, upon receipt of the at least one first ciphertext CA at the second communication device 210B, connecting the second encryption device 100B and the second communication device 210B so as to allow data transfer between the second encryption device 100B and the second communication device 210B, communicating the at least one first ciphertext CA to the second encryption device 100B, upon receipt of the at least one first ciphertext CA at the second encryption device 100B, decrypting the at least one first ciphertext CA on the basis of the at least one generated key provided to the other one of the first and second encryption devices 100A, 100B for retrieving the first plaintext PA, and communicating the retrieved first plaintext PA to the second communication device 210B, and separating the second encryption device 100B and the second communication device 210B such that data transfer between the second encryption device 100B and the second communication device 210B is disabled.

In accordance with seventeenths embodiments of the present disclosure, the method of the sixteenths embodiments may be implemented such that generating at least two keys comprises generating a master key and a first key, both of which being provided to the other one of the first and second encryption devices 100A, 100B.

In accordance with eighteenths embodiments of the present disclosure, the method of the sixteenths embodiments may be comprise at each of the first and second encryption devices 100A, 100B, synchronizing counter quantities stored by each of the first and second encryption devices 100A, 100B to a default common value, after communicating the first plaintext PA to the second communication device 210B, generating a second key on the basis of the master key and the first key at the second encryption device 100B which is provided with a second plaintext PB for encryption and encrypting the second plaintext PB with the second key, increasing the counter quantities at each of the first and second encryption devices 100A, 100B, and iteratively generating keys on the basis of the master key, a previously generated key, and the counter quantity starting with the second key and the increased counting quantities.

In accordance with nineteenths embodiments of the present disclosure, the method of the sixteenths embodiments may be implemented such that generating of at least two keys comprises generating a plurality of key pairs, each having plural public keys and plural private keys. Herein, providing at least one of the generated keys to the other one of the first and second encryption devices (100A, 100B) comprises one of a) providing a first subset of the generated plurality of key pairs to the other one of the communication devices, and providing only public keys of a second subset of key pairs different from the first subset to the other one of the first and second encryption devices 100A, 100B, or b) generating key pairs having public and private keys at each of the first and second encryption devices 100A, 100B, wherein each key pair has an identifying quantity assigned thereto such that each key pair is uniquely identifiable, and exchanging the generated public keys together with the identifying quantity among the first and second encryption devices 100A, 100B.

In accordance with twentieths embodiments of the present disclosure, the method of the sixteenths embodiments may be implemented such that the generating of at least two keys comprises generating a predefined number of keys, each of the predefined number of keys only being used once at each of the first and second encryption devices 100A, 100B for generating a ciphertext.

What is claimed is:
1. An encryption device, comprising:
 a communication interface configured to communicate with an associated separate communication device which is used by a user of the encryption device for communicating in a communication network and which is at least electronically disconnected from the encryption device and becomes temporarily connected when plaintext data or ciphertext data is to be communicated among the encryption device and the communication device;
 a variable key generator configured to generate at least two keys;
 a memory configured to store keys that are either generated by the variable key generator and/or received at the communication interface; and
 an encryption component configured to successively use keys stored in the memory for encrypting a plaintext received at the communication interface and for decrypting a ciphertext received at the communication interface,
  wherein the encryption device is not able to directly access the communication network.

2. The encryption device of claim 1, wherein the variable key generator is configured to generate a master key and a first encryption key, and
 to iteratively generate at least one subsequent encryption key on the basis of the master key and a previous key, starting in a first iteration with the first key,
  wherein the variable key generator is configured to generate multiple key pairs, each having a public key and a private key,
  wherein the multiple key pairs have identifying quantities assigned thereto such that each key pair is uniquely identifiable, and wherein the communication interface is further configured to transmit the public keys of the multiple key pairs together with the assigned identifying quantities to at least one further encryption device or
 to transmit at least one first subset of the generated key pairs and only public keys of a second subset to at least one further encryption device, the second subset and the at least one first subset being mutually different,
  wherein the key pairs of the at least one first subset and of the second subset have identifying quantities assigned thereto such that each key pair is uniquely identifiable, the encryption device being further configured to provide the associated communication device with an identifying quantity assigned to a given key used by the encryption component.

3. The encryption device of claim 1, wherein the variable key generator is configured to generate a predefined number of keys to be stored in the memory, the predefined number of keys being greater than two,
 wherein each of the generated keys has an identifying quantity associated therewith such that each key is uniquely identifiable, and
 wherein the encryption component is further configured:
 to select one of the keys stored in the memory on the basis of the identifying quantity of the selected key fulfilling a predetermined condition, and
 on the basis of the selected key, to
  decrypt ciphertext received at the communication interface, or
  encrypt plaintext received at the communication interface.

4. The encryption device of claim 1, wherein the encryption device is a smart card.

5. The encryption device of claim 1, wherein the variable key generator is configured to successively generate at least one key, when a predefined condition is fulfilled, the predefined condition being defined on the basis of a predetermined number of plaintexts received at the communication interface and/or a predefined time interval elapsed between two consecutive plaintexts received at the communication interface and/or a predefined time elapsed since keys are stored by the memory and/or a predefined number of keys being used by the encryption device and/or a key being used a predefined number of times.

6. A communication system, comprising:
an encryption device, and
the associated communication device which is used by a user for communicating in a communication network, the communication device having a first communication port adapted to transmit and receive data from the communication network, and a second communication port adapted to transmit and receive data from the encryption device;
wherein the associated communication device is adapted to:
transmit ciphertexts received at the first communication port to the encryption device via the second communication port; and
transmit ciphertexts received at the second communication port to the communication network via the first communication port,
wherein the encryption device is not able to directly access the communication network and the encryption device comprises:
a communication interface configured to communicate with an associated separate communication device which is used by a user of the encryption device for communicating in a communication network and which is at least electronically disconnected from the encryption device and becomes temporarily connected when plaintext data or ciphertext data is to be communicated among the encryption device and the communication device;
a variable key generator configured to generate at least two keys;
a memory configured to store keys that are either generated by at least one of the variable key generator and received at the communication interface; and
an encryption component configured to successively use keys stored in the memory for encrypting a plaintext received at the communication interface and for decrypting a ciphertext received at the communication interface,
wherein the encryption device is not able to directly access the communication network.

7. The communication system of claim 6, wherein the associated communication device further comprises an input interface for enabling the user to enter plaintext data, the associated communication device being adapted to transmit entered plaintext data to the communication interface of the encryption device via the second communication port.

8. The communication system of one of claim 6, wherein the communication interface of the encryption device and the second communication port of the associated communication device are provided as mating USB terminals or as RFID transceivers or as wearable devices, or
wherein the encryption device is provided as a smart card and the second communication port comprises a card reader mating with the smart card, or
wherein the second communication port and the communication interface are configured to communicate with each other via wireless communication or a wired communication network.

9. The communication system of claim 6, wherein the communication system further comprises
at least two more encryption devices and communication devices which are defined in accordance with the encryption device and the communication device of claim 6 such that each of the at least three communication devices is associated to one of the at least three encryption devices, each communication device being used by a user for communicating in a communication network, each communication device having a first communication port adapted to transmit and receive data from the communication network, and a second communication port adapted to transmit and receive data from the encryption device,
wherein the memory of each of the at least three encryption devices has a plurality of keys and an identifying quantity assigned to each key such that each key is uniquely identifiable stored thereon,
wherein each of the associated communication devices is adapted to:
transmit ciphertexts received at the first communication port to the associated encryption device via the second communication port, and
transmit ciphertexts received at the second communication port to the communication network via the first communication port, and
wherein each of the encryption devices is configured to forward identifying quantities in an conversation to each encryption device not participating in the conversation for keeping track of the key used in the conversation.

10. The method of claim 6, wherein the variable key generator is configured to generate a master key and a first encryption key and to iteratively generate at least one subsequent encryption key on the basis of the master key and a previous key, starting in a first iteration with the first key, or
wherein the variable key generator is configured to generate multiple key pairs, each having a public key and a private key, wherein the multiple key pairs have identifying quantities assigned thereto such that each key pair is uniquely identifiable, and wherein the communication interface is further configured to:
transmit the public keys of the multiple key pairs together with the assigned identifying quantities to at least one further encryption device or
transmit at least one first subset of the generated key pairs and only public keys of a second subset to at least one further encryption device, the second subset and the at least one first subset being mutually different, wherein the key pairs of the at least one first subset and of the second subset have identifying quantities assigned thereto such that each key pair is uniquely identifiable, the encryption device being further configured to provide the associated communication device with an identifying quantity assigned to a given key used by the encryption component.

11. The method of claim 6, wherein the variable key generator is configured to generate a predefined number of keys to be stored in the memory, the predefined number of keys being greater than two,
wherein each of the generated keys has an identifying quantity associated therewith such that each key is uniquely identifiable, and
wherein the encryption component is further configured:
to select one of the keys stored in the memory on the basis of the identifying quantity of the selected key fulfilling a predetermined condition, and
on the basis of the selected key, to
decrypt ciphertext received at the communication interface, or
encrypt plaintext received at the communication interface.

12. A method of exchanging encrypted data in a communication network,
wherein the communication network comprises at least a first communication device with an associated separate first encryption device and a second communication device with an associated separate second encryption device, the first communication device being temporarily connected with the associated first encryption device and the second communication device being temporarily connected with the associated second encryption device when plaintext data or ciphertext data is to be communicated among each of the encryption devices and its associated communication device, and
wherein none of the encryption devices is able to directly access the communication network,
wherein the method comprises:
connecting the first encryption device and the first communication device so as to allow data transfer between the first encryption device and the first communication device;
communicating a first plaintext which is input into the first communication device, to the first encryption device;
  upon receipt of the first plaintext at the first encryption device, encrypting the first plaintext on the basis of one key present at the first encryption device and generating at least one first ciphertext associated with the first plaintext;
communicating the at least one first ciphertext to the first communication device;
separating the first encryption device and the first communication device such that data transfer between the first encryption device and the second encryption device is disabled;
transmitting the at least one first ciphertext to the second communication device;
upon receipt of the at least one first ciphertext at the second communication device, connecting the second encryption device and the second communication device so as to allow data transfer between the second encryption device and the second communication device:
communicating the at least one first ciphertext to the second encryption device;
upon receipt of the at least one first ciphertext at the second encryption device, decrypting the at least one first ciphertext on the basis of the at least one key provided to the other one of the first and second encryption devices for retrieving the first plaintext; and
communicating the retrieved first plaintext to the second communication device; and
separating the second encryption device and the second communication device such that data transfer between the second encryption device and the second communication device is disabled.

13. The method of claim 12, wherein the method further comprises performing an initiation sequence prior to communicating the first plaintext with the initiation sequence comprising:
generating a plurality of keys for each of the first and second to encryption devices, wherein each of the keys an identifying quantity assigned thereto such that each key is uniquely identifiable, and
exchanging the generated keys together with the identifying quantity among the first and second to encryption devices,
wherein the method further comprises, at the exchange of encrypted data, forwarding the identifying quantity of the key used by the first encryption device in the encryption to each encryption device not participating in the conversation for keeping track of the key used by the first and second encryption devices such that each of the keys is only used once by the encryption devices.

14. The method of claim 12, wherein the method further comprises performing an initiation sequence prior to communicating the first plaintext, wherein the initiation sequence comprises:
initiating a conversation between the first communication device and the second communication device on behalf of at least one of the first and second communication devices;
generating at least two keys by one of the first and second encryption devices; and
providing at least one of the generated keys to the other one of the first and second encryption devices.

15. The method of claim 14, wherein generating at least two keys comprises generating a master key and a first key, both of which being provided to the other one of the first and second encryption devices.

16. The method of claim 15, further comprising
at each of the first and second encryption devices, synchronizing counter quantities stored by each of the first and second encryption devices to a default common value,
after communicating the first plaintext to the second communication device, generating a second key on the basis of the master key and the first key at the second encryption device which is provided with a second plaintext for encryption and encrypting the second plaintext with the second key,
increasing the counter quantities at each of the first and second encryption devices, and iteratively generating keys on the basis of the master key, a previously generated key, and the counter quantity starting with the second key and the increased counting quantities.

17. The method of claim 14, wherein generating of at least two keys comprises generating a plurality of key pairs, each having plural public keys and plural private keys, and
wherein providing at least one of the generated keys to the other one of the first and second encryption devices comprises one of
a) providing a first subset of the generated plurality of key pairs to the other one of the communication devices, and
providing only public keys of a second subset of key pairs different from the first subset to the other one of the first and second encryption devices, or
b) generating key pairs having public and private keys at each of the first and second encryption devices, wherein each key pair has an identifying quantity assigned thereto such that each key pair is uniquely identifiable, and
exchanging the generated public keys together with the identifying quantity among the first and second encryption devices.

* * * * *